Figure 1:
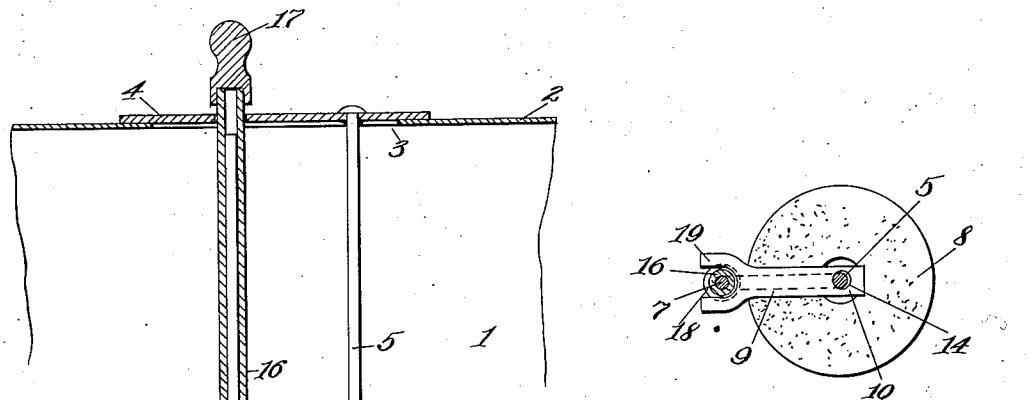

P. E. TANNER.
GAGE FOR LIQUID CONTAINING TANKS.
APPLICATION FILED MAY 29, 1914.

1,179,471.

Patented Apr. 18, 1916.
3 SHEETS—SHEET 1.

Witnesses:
R. L. Bruck.
H. B. McGill.

Inventor:
Perry E. Tanner,
By Hull Smith,
Att'ys.

P. E. TANNER.
GAGE FOR LIQUID CONTAINING TANKS.
APPLICATION FILED MAY 29, 1914.
1,179,471.
Patented Apr. 18, 1916.
3 SHEETS—SHEET 2.
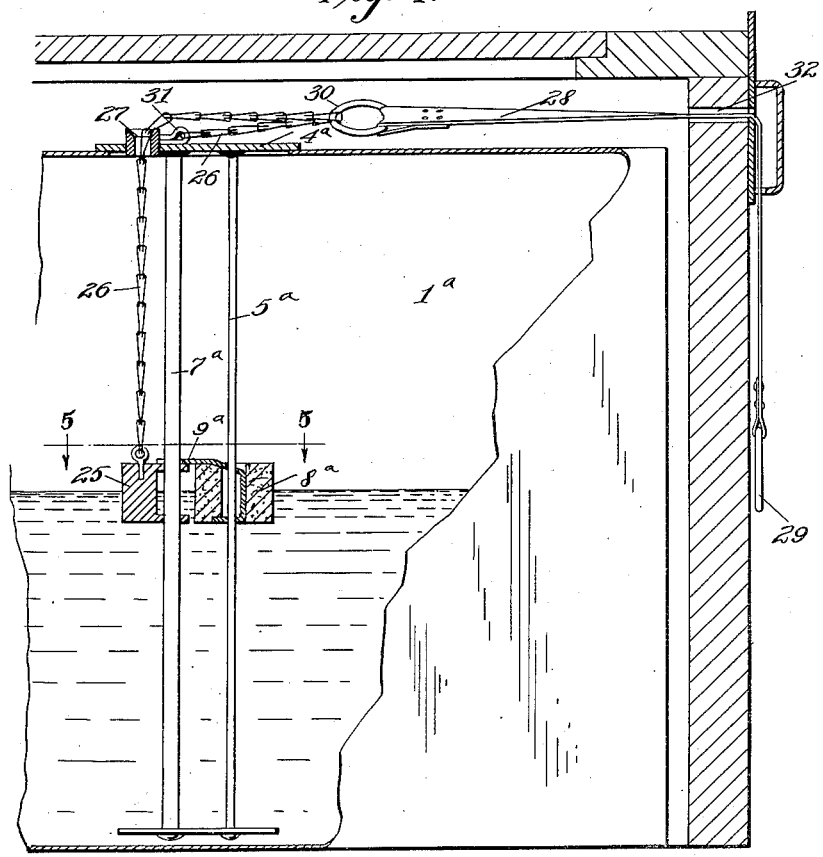
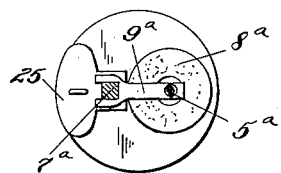
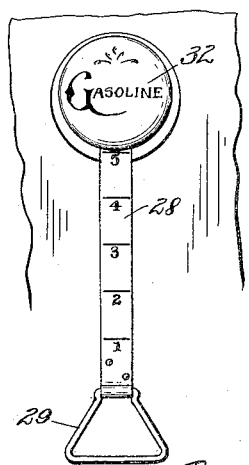

UNITED STATES PATENT OFFICE.

PERRY E. TANNER, OF AKRON, OHIO.

GAGE FOR LIQUID-CONTAINING TANKS.

1,179,471.  Specification of Letters Patent.  Patented Apr. 18, 1916.

Application filed May 29, 1914. Serial No. 841,777.

*To all whom it may concern:*

Be it known that I, PERRY E. TANNER, a citizen of the United States, residing at Akron, in the county of Summit and State of Ohio, have invented a certain new and useful Improvement in Gages for Liquid-Containing Tanks, of which the following is a full, clear, and exact description, reference being had to the accompanying drawings.

This invention relates to gages for liquid containing tanks and has for its object the provision of a very simple, economical, reliable, and inexpensive form of gage whereby the amount of liquid remaining in the tank can be determined at any time. The ends particularly aimed at in the provision of my improved gage are lightness, so as to permit it to be used in connection with the fuel and oil tanks of motorcycles, airships, and the like; cheapness, so as to permit its use upon inexpensive machines, compactness so as to permit it to be installed in a tank without the necessity of providing a large opening in the side thereof; and serviceability, so as to permit its continued operation under adverse conditions or severe mishandling.

An additional object of the invention is the provision of a device of this character by means of which the amount of liquid within the tank can be determined by the sense of touch practically as well as by the sense of sight, thus facilitating its use at night or in emergencies where the operator is unable to divert his eyesight, while further objects and advantages of the invention will become apparent as the description proceeds.

Figure 2:
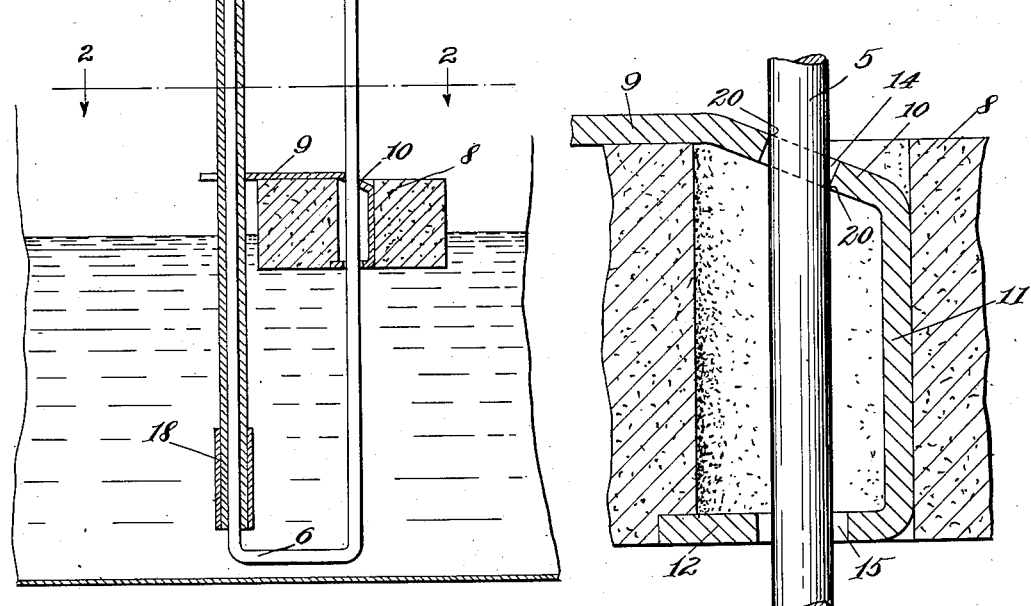
Figure 3:
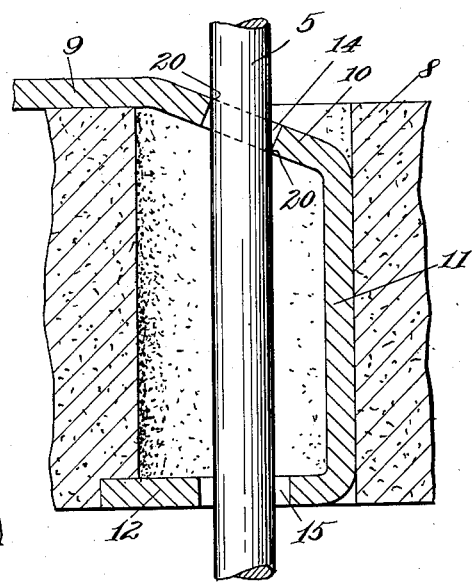
Figure 7:
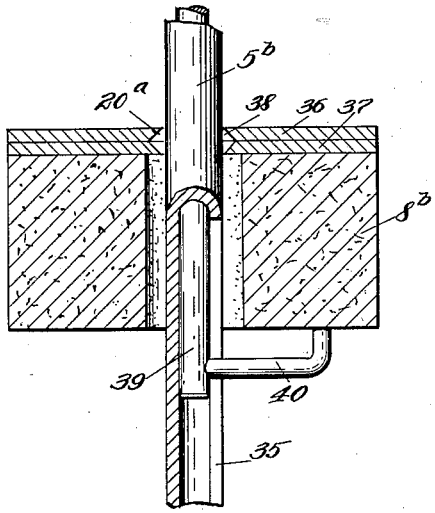
Figure 8:
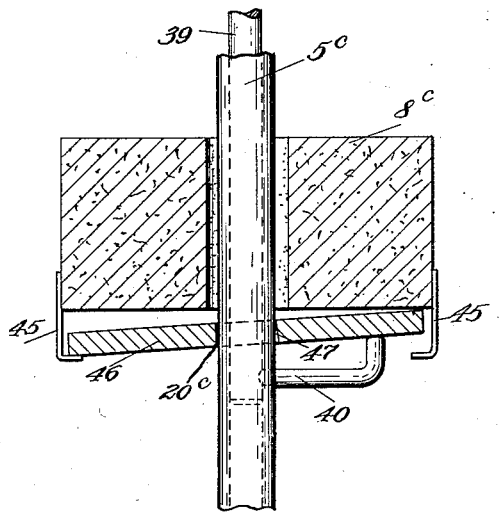
Figure 9:
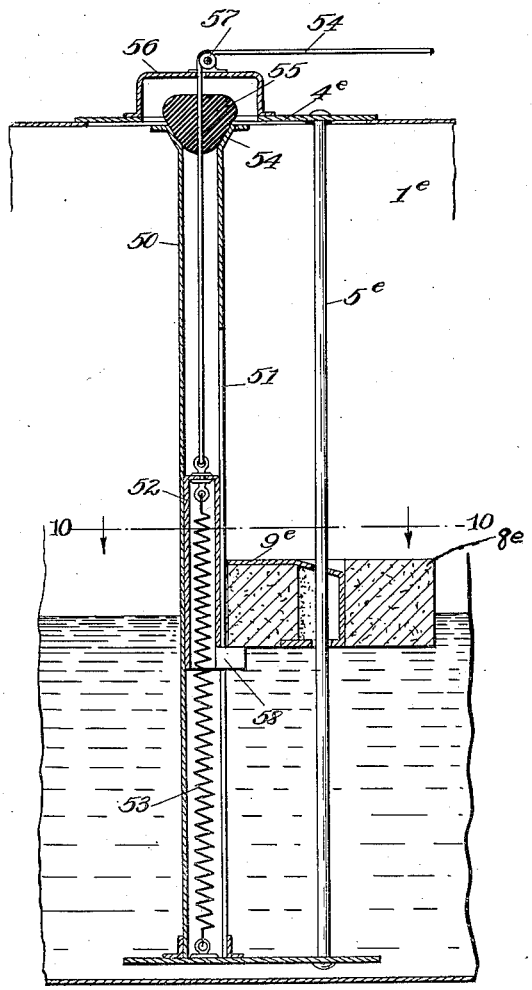
Figure 10:
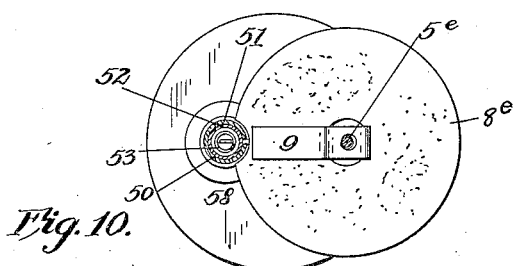

Generally speaking my invention may be defined as consisting of the combinations and constructions recited in the claims hereto annexed and illustrated in the drawings accompanying and forming a part of this specification, wherein;

Figure 1 is a vertical, cross-sectional view taken through a preferred form of my improved gage, showing the same in position in a liquid tank; Fig. 2 is a detail view taken upon the line 2—2 of Fig. 1 and looking downwardly; Fig. 3 is a detail view of a portion of the gripping mechanism drawn to enlarged scale; Fig. 4 is a vertical, cross-sectional view of a modified form of my invention, showing the application of the same to a comparatively inaccessible tank; Fig. 5 is a detail view taken upon the line 5—5 of Fig. 4 and looking downwardly; Fig. 6 is a detail view of a portion of the device shown in Fig. 4; Fig. 7 is a detail, cross-sectional view showing a modified form of gripping mechanism; Fig. 8 is a sectional view showing a still further modification of the gripping mechanism; Fig. 9 is a vertical, cross-sectional view showing a third modification of the gage device; and Fig. 10 is a detail view taken upon the line 10—10 of Fig. 9 and looking downwardly.

Describing by reference characters the parts illustrated in Figs. 1, 2 and 3, 1 represents a liquid containing tank of any nature or construction but having an accessible top 2 in which is formed an opening 3 over which is applied a cover-plate 4. Depending from this cover plate is a guide member 5 which extends substantially to the bottom of the tank and is there bent laterally as at 6 and finally upwardly again as at 7, forming a U-shaped device. Surrounding the guide member 5 is an annular float 8 to which is secured a gripping member, which in the present embodiment, comprises an elongated, horizontal leg 9 overlying the top of the float, an inclined portion 10 projecting into the aperture of the float, a portion 11 at right angles to the portion 9, and a terminal portion 12 substantially parallel to the portion 9. The inclined portion 10 is formed with a cylindrical aperture 14 whose axis is substantially perpendicular to the portion 10 and whose size is sufficient to permit the float to slide freely along the guide member 5 in case their axes are parallel. The portion 12 is also formed with an aperture 15 adapted for the reception of this guide member, and preferably of elongated form so as to permit the gripping device to rock with reference thereto.

Supported for movement independently of the float but parallel to the guide member 5 is a feeler member, arranged to engage and operate said gripping device so as to lock the same upon the guide member and thereby have its own movement positively arrested. In the present embodiment this feeler member comprises a hollow sleeve 16 slidably mounted on the leg 7 and projecting outside the tank through a suitable aperture in the plate 4. The upper end of this sleeve is provided with a handle 17 whereby it may be grasped, and its lower end with an enlargement 18 adapted to engage the end of the leg 9 which is here shown as bifurcated and having branches 19 embracing this sleeve. The edges of the part 10 about the aperture 14 are made sharp as shown at 20—20 in Fig. 3.

With this construction the float will normally take a position substantially at the level of the liquid as shown in Fig. 1. When it is desired to ascertain what this level is the sleeve 16 is drawn upwardly so as to bring the projection 18 into contact with the portion 9 of the gripping device whereupon the same is inclined or canted slightly so that the edges 20—20 of the aperture 14 bite against the guide member 5 and resist further movement of the sleeve. The amount of liquid in the tank is then determinable either by means of suitable graduations on the exterior of the sleeve or by the general position of the sleeve, and the latter can be determined to an accuracy sufficient for most purposes about as well by the sense of feeling as by the sense of sight. The force of the engagement between the gripping device and the guiding member depends entirely upon the force exerted on the feeler member and not at all upon the float action, the float serving merely to set this gripping device at a point dependent upon the liquid level. Accordingly force with which the feeler member is manipulated has no effect upon the indicator.

In case the tank be so located that access to the upper portion thereof is impossible, some such arrangement as that illustrated in Fig. 4 may be employed. In this view the tank is indicated at $1^a$, the cover plate at $4^a$, the latter carrying a guide member $5^a$ similar to the guide member 5, and also an independent supporting member $7^a$ parallel thereto. Slidably mounted upon the guide member $5^a$ is a float $8^a$ similar in all respects to that previously described and likewise having a gripping device with its overhanging arm $9^a$. Slidably mounted upon the guide member $7^a$ is a weight 25 to which is attached a chain or like tension member 26 which passes through an aperture 27 in the cover plate and is suitably secured to a flexible tape 28 provided with a handle 29 whereby it may be grasped. In the present embodiment the chain is passed through a loop 30 carried by the end of the tape and brought back to an anchorage 31 carried by the cover plate, thus rendering the loop 30 a kind of pulley and causing the movement of the tape to be just one half of what it would be if it were connected directly to the chain. This tape may be carried to any convenient place for reading, the arrangement here illustrated consisting of passing it through a suitable fitting 32 carried by the tank casing, and the tape may be provided with graduations indicating the volume of liquid in the tank or such volume may be estimated by feeling or by the general length of tape extracted. The weight 25 is employed for the purpose of retrieving the tape, although it is obvious that other expedients could be employed.

In Fig. 7 I have illustrated a construction in which the member which guides the float also serves to guide the feeler member. In this embodiment the guide member $5^b$ is shown as hollow and having in its side an elongated slot 35. The float $8^b$ is slidably mounted upon this guide member as before and carries a gripping device here shown as consisting of two plates 37—37 having central registering beveled apertures 38 providing sharp biting edges $20^a$—$20^a$ arranged to grip the exterior of the guide member upon tilting of the float. Inside of the guide member 5 is mounted a slidable rod 39 having at its lower end a side branch 40 projecting through the slot 35 and arranged to engage a portion of the float at a distance from its center, whereby the same may be tilted so as to grip the guide member and arrest the further movement of the rod 39.

In Fig. 8 I have illustrated another embodiment of my invention wherein a hollow guide member $5^c$ is employed having sleeved thereon an annular float $8^c$ having secured to its lower portion a plurality of fingers 45—45 loosely holding in place a metal plate 46. This plate has a central aperture 47 receiving the guide member $5^c$ and providing the abrupt biting edges $20^c$. Within the guide member $5^c$ is slidably mounted the rod 39 having a side branch 40 projecting through a slot in the side of the guide member and adapted to engage the plate 46 at a distance from its center so as to incline the same as shown in Fig. 8 and arrest the further movement of the rod 39. It will be apparent that the rod 39 and branch 40 need not be arranged inside of the float but could be outside as would be the case if the float $8^b$ or $8^c$ together with its accompanying parts were substituted bodily for the floats shown in Figs. 1 and 4.

In Fig. 9 I have shown yet another modification more particularly adapted for use in connection with vacuum or pressure tanks or those containing noxious or inflammable fumes. In this embodiment the tank $1^e$, guide member $5^e$, float $8^e$, and gripping member $9^e$ are the same as in Fig. 4. Depending from the cover plate $4^e$ parallel with the guide member $5^e$ is a hollow tube 50 having in its side an elongated slot 51 and having slidably mounted therein a feeler member consisting of the plunger 52. This plunger is normally maintained at the bottom of this tube by means of a suitable spring 53, and is raised upon occasion by means of a suitable tension member 54, preferably a smooth surfaced cable. This cable passes through a soft rubber plug 55 which, upon the retraction of the plunger seats within the flared upper end 54 of the tube and is thereby constricted upon the cable so as efficiently to prevent leakage. Undue displacement of this plug is prevented by means of the cap 56 secured to the cover plate, which also forms a mode of attachment for the pulley 57, while the plunger 52 is provided with a laterally extending finger 58 adapted to engage some part of the float $8^e$ and tilt the same so as to arrest the further movement of the plunger. In this embodiment the side of the float is shown as notched as at 58 for the reception of the tube 50, and is thereby held against rotation so that the gripping device may always be in a position to bite upon the guide $5^e$. In Figs. 1 and 4 the end of the gripping members 9 and $9^a$ are shown as forked for the same purpose, while in Figs. 7 and 8, the gripping device being symmetrical, no such expedient is necessary. The gripping device shown in Figs. 1, 4 and 9 is rigidly connected to the float so that the float itself is tilted slightly by the action of the feeler, though this construction is entirely for purposes of convenience in manufacture and is not essential. In similar contrast Fig. 7 shows a modification in which the gripping member is rigid with the float and Fig. 8 one where the same are separate.

It will be obvious that many changes in shape, detail, arrangement, and connection of parts could be made without departing from my invention, wherefore I do not limit myself in any manner except as specifically recited in the claims hereto annexed or rendered necessary by the prior state of the art.

Having thus described my invention, what I claim is:—

1. A gage for liquid containing tanks, comprising a guide member adapted to be secured inside the tank in substantially vertical position, a float slidable therealong, a gripping member connected to said float, a feeler member movable in a direction substantially parallel to said float and adapted to operate said gripping member, said gripping member being arranged to grip said guide member upon engagement by said feeler member, and means for operating said feeler member from the exterior of the tank, whereby its position when arrested by said gripping member shall serve to indicate the amount of liquid in the tank.

2. In a gage for liquid containing tanks, a manually reciprocable member, a movable member supported for sliding movement adjacent to the path of movement of said reciprocable member and engageable therewith to prevent its movement therepast, and a float connected to said movable member and adapted to shift the position thereof along its path of movement according to the level of the liquid in said tank.

3. In a gage for liquid containing tanks, a manually reciprocable member, a guiding member adjacent thereto, a gripping device carried by said guiding member and projecting into the path of movement of said reciprocable member and adapted when engaged thereby to become rigidly affixed to said guiding member so as to prevent said reciprocable member from moving therepast, and a float connected to said gripping device and adapted to shift the position thereof according to the level of liquid in the tank.

4. In a gage for liquid containing tanks, a guide member adapted to be secured in upright position in said tank, a gripping device movable along said guide member, a float secured to said gripping device and adapted to shift the position thereof according to the level of the liquid in the tank, and a manually operable feeler member arranged for movement adjacent to said guide member and adapted to engage said gripping device and affix it to said guide member whereby the movement of said feeler member is arrested.

5. In a gage for liquid containing tanks a guide rod adapted to be secured in upright position in said tank, a gripping device movable along said rod and comprising a metal plate having an aperture therethrough receiving said rod, the edges of said aperture defining biting edges adapted to grip said rod when said plate is inclined, and a manually operable feeler member movable along a path adjacent to said rod and adapted to engage and tilt said plate, whereby said plate will be immovably fixed to said rod and the further movement of said feeler member prevented.

6. In a gage for liquid containing tanks a pair of substantially parallel guide rods adapted to be supported in upright position inside the tank, a feeler member slidable along one rod, a gripping device slidable along the other rod and having a part projecting into the path of movement of said feeler member, said gripping device being adapted to be secured immovably to its rod when engaged by said feeler member, and a float connected to said gripping device and adapted to shift the same along its rod.

In testimony whereof, I hereunto affix my signature in the presence of two witnesses.

PERRY E. TANNER.

Witnesses:
E. W. STUART,
A. W. TANNER.